United States Patent
Lightfoot et al.

(10) Patent No.: US 7,380,706 B2
(45) Date of Patent: Jun. 3, 2008

(54) GUN IDENTIFICATION KIT

(75) Inventors: Jim R. Lightfoot, Windermere, FL (US); Robert A. Walsh, Westmount (CA); Peter L. Gagliardi, Vienna, VA (US)

(73) Assignee: Forensic Technology Wai Inc., Cote Saint-Luc, Quebec (CA)

( * ) Notice: Subject to any disclaimer, the term of this patent is extended or adjusted under 35 U.S.C. 154(b) by 590 days.

(21) Appl. No.: 10/790,344

(22) Filed: Mar. 1, 2004

(65) Prior Publication Data

US 2004/0227001 A1     Nov. 18, 2004

(51) Int. Cl.
*G06F 17/00*     (2006.01)

(52) U.S. Cl. .................................. 235/375; 235/383
(58) Field of Classification Search ............... 235/375, 235/380, 385, 383
See application file for complete search history.

(56) References Cited

U.S. PATENT DOCUMENTS 5,654,801 A    8/1997    Baldur
6,833,911 B2 *   12/2004   Lizotte ..................... 356/71

* cited by examiner

*Primary Examiner*—Karl D. Frech
(74) *Attorney, Agent, or Firm*—Sidley Austin LLP

(57) ABSTRACT

A firearm identification kit is provided including a data storage media bearing ballistics information and other indicia that may be useful in matching a fired spent cartridge case or bullet to the firearm that fired it.

16 Claims, 2 Drawing Sheets

GUN IDENTIFICATION KIT

FIELD OF THE INVENTION

The present invention relates to the identification of firearms in general, and more particularly to a kit containing ballistics and other information that may be used to identify a firearm.

BACKGROUND OF THE INVENTION

It is highly desirable to identify a gun used in a crime. Identifying the source of a firearm used in a crime can quickly provide police or other law enforcement officials with an active lead in the crime investigation. Many firearms have a serial number or other identifying markings etched or engraved into the gun during manufacture. If a crime gun is recovered, such markings may help law enforcement official locate the owner of the gun, where it was purchased, and other useful information. However, serial numbers and other identifying markings may be removed from firearms used in the commission of a crime, making identification of a gun used in a crime more difficult.

If a crime gun is not available, other methods may be used to identify the weapon. Fired bullets and spent cartridge cases typically have characteristic markings caused by the gun from which they were fired. These markings result from forced contact between the bullet or cartridge casing and the metal parts of the firearm. Machining of the parts during the manufacturing process yield microscopic differences between one part and the next. Microscopic examination of fired bullets and spent cartridge cases can be used to demonstrate that they were likely to have been fired by a specific gun.

Automated ballistics matching systems, such as the Integrated Ballistic Identification System (IBIS) and the National Integrated Ballistic Information Network (NIBIN), are already in use by some law enforcement agencies for the identification of firearms. Such systems enable spent cartridge cases recovered from a crime scene to be matched against a database of cartridge cases and firearms. If a match is found, the information can provide beneficial leads to help solve a crime more quickly. More information about gathering and using ballistics information is described for example, in U.S. Pat. No. 5,554,801, issued on Aug. 5, 1997, which is incorporated herein in its entirety by this reference.

However, automated systems like IBIS and NIBIN only provide useful information if there are matching cartridge case images in the database. Cartridge case images in the database often come from cartridge cases found at crime scenes, for example. Because the vast majority of publicly owned firearms have not been used in the commission of a crime, they will not show up in an IBIS or NIBIN-type database. It would therefore be desirable to provide a means for increasing the number of firearms for which IBIS/NIBIN-type information and data is available.

One means of populating an IBIS/NIBIN-type database would be to mandate that ballistic information be obtained and entered into the database for all firearms. However, such a mandate would be politically unpalatable in many places. For example, in the United States powerful activists groups would resist such a mandate as an affront to the right to bear arms and an infringement of privacy rights. Therefore, it would be desirable to provide information for populating IBIS/NIBIN-type databases without hampering such basic rights.

Stolen firearms represent a significant source of guns used in crimes. A European study reported that as many as 95% of guns used in crimes are stolen from individuals and legitimate dealers. A study by Americans for Gun Safety indicated that approximately 1.7 million guns were stolen in the United States during a ten year period; that 81.2% of the stolen guns were taken from individuals; and that over half are still missing. It would also be desirable to provide methods and apparatus for supplying IBIS/NIBIN-compatible ballistic information to the authorities when a firearm is lost or stolen.

BRIEF SUMMARY OF THE INVENTION

It is, therefore, an object of the invention to provide methods and apparatus for increasing the number of firearms that are represented in IBIS/NIBIN-type databases.

It is also an object of the invention to provide means for populating IBIS/NIBIN-type databases without hampering a right to possess firearms or infringing on privacy rights.

It is an additional object of the invention to provide means for supplying IBIS/NIBIN-compatible ballistic information to the authorities when a firearm is lost or stolen.

These and other objects of the invention are achieved by a gun identification kit associated with a specific firearm and that contains important gun identification data. Each new gun purchaser is provided with a corresponding gun identification kit corresponding to the newly purchased gun. The gun identification kit includes one or more IBIS/NIBIN-compatible images of a spent cartridge case fired from the gun, as well as the gun's serial number and other identifying information. In the event the gun is lost or stolen, the gun identification information can be conveyed to law enforcement agencies.

BRIEF DESCRIPTION OF THE DRAWINGS

The above and other objects and advantages of the present invention will be apparent upon consideration of the following detailed description, taken in conjunction with the accompanying drawings, in which like characters refer to like parts throughout and in which.

DETAILED DESCRIPTION OF THE INVENTION

In accordance with the principles of the present invention, a firearm identification kit provides a convenient source of firearm identification information that may be provided to law enforcement officials or agencies in the event a firearm is lost of stolen. The kit includes a non-volatile storage media on which various identification information associated with a specific firearm is recorded. The identification information includes a description or image of any unique ID markings on the cartridge case, at least one image of the breech face of a fired cartridge case compatible with existing law enforcement databases and ballistics comparison systems, and the serial number of the firearm.

Preferably, a firearm identification kit is created for every firearm prior to the firearm being sold. Manufacturers may collect the information and create a firearm identification kit when the firearm is manufactured. Alternatively, a gun dealer may create a firearm identification kit prior to selling a firearm to an individual, to be provided to the owner with the gun. For existing firearms, a firearm identification kit may be created as a service by a third party, such as a shooting range, a gun safety organization, or a law enforcement agency. The completed firearm identification kit is then provided to the gun owner. Whenever a firearm is sold or otherwise transferred, the firearm identification kit is also transferred to the new owner.

To ensure privacy, the firearm identification kit is kept by the owner of the firearm. Any owner-identifying information created or gathered in the preparation of a firearm identification kit or package is destroyed. Therefore, a firearm owner is the sole possessor of the information in the firearm identification kit. Although no records on the firearm would be kept, it may be desirable to keep aggregate information for the purpose of calculating usage fees and/or to measure system effectiveness. Preferably, such aggregate information would be in the form of raw data such as the number of kits or packages created, the number turned over to law enforcement agencies, and other such information.

Figure 1:
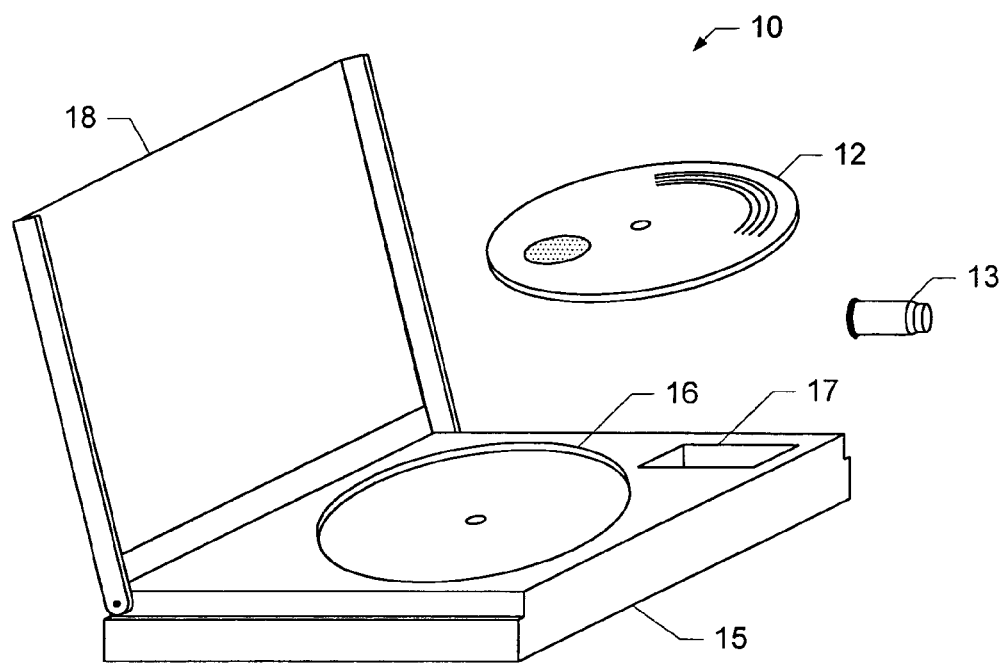
FIG. 1, is a illustrative embodiment of a firearm identification kit in accordance with the principles of the present invention.

Referring to FIG. 1, firearm identification kit 10 preferably includes low cost, non-volatile, write-once media such as a CD-R or DVD-R 12. The firearm identifying information is stored on media 12 in a computer readable fashion. For example, the information may be stored as one or more image and text files in a conventional directory structure, although other standard and non-standard organizational structures may also be used. Additional information, such a gun safety information, owner's/user's manuals and the like may also be stored on media 12. To easily match a firearm identification kit to a firearm, media 12 includes basic identification information about the firearm such as its make and model, it's serial number, and/or other readily identifying mark or information on the label of the storage media. For example, in FIG. 2, media 12 includes make and model 21 and serial number 22 of the firearm associated with the information recorded on the media. Furthermore, media 12 may include logo 24 or other indicia of a firearm manufacturer or identification kit sponsoring organization.

Preferably, media 12 is a relatively permanent, non-volatile data storage media. In one embodiment, media 12 is a write once type of optical disk, such as a CD-R or DVD-R disk. The use of a write once optical disk simplifies the manufacture of the firearm identification kit because the discs may be created using low cost commodity disk recording hardware and software. Rewritable disks may be used; however, a mechanism to prevent altering or tampering with the firearm identification data stored on the disk should be provided. Case 15 includes recess 16 for storing media 12 and protects media 12 from physical and environmental damage. Other media including hard disks, floppy disks and solid state memory devices may also be used, as long as they provide a sufficiently rugged and robust form of data storage.

In accordance with the present invention, a new firearm is preferably test fired at the point of manufacture or the point of sale. The spent cartridge case and/or fired bullet are recovered and imaged. Preferably, the breach face and firing pin markings are imaged in a NIBIN compatible format and the images stored on a CD or other external storage medium. Multiple images may also be included using various degrees of magnification and different forms of illumination to highlight unique features of the cartridge case. Non-IBIS/NIBIN compatible images may be included if needed to show specific characteristics of the cartridge case.

Because many firearms have already been sold and are in circulation among the public, post-sale locations, e.g., law enforcement facilities, firing ranges, etc., should be available for creating the firearm identification information for the kit are contemplated for the broadest application of the concept. A gun owner may take a weapon to such a facility to obtain the data necessary to create a firearm identification kit in accordance with the principles of the present invention. Specifically, the gun owner may have the weapon test fired, and the cartridge case and/or bullet recovered for IBIS/NIBIN compatible imaging.

Figure 2:
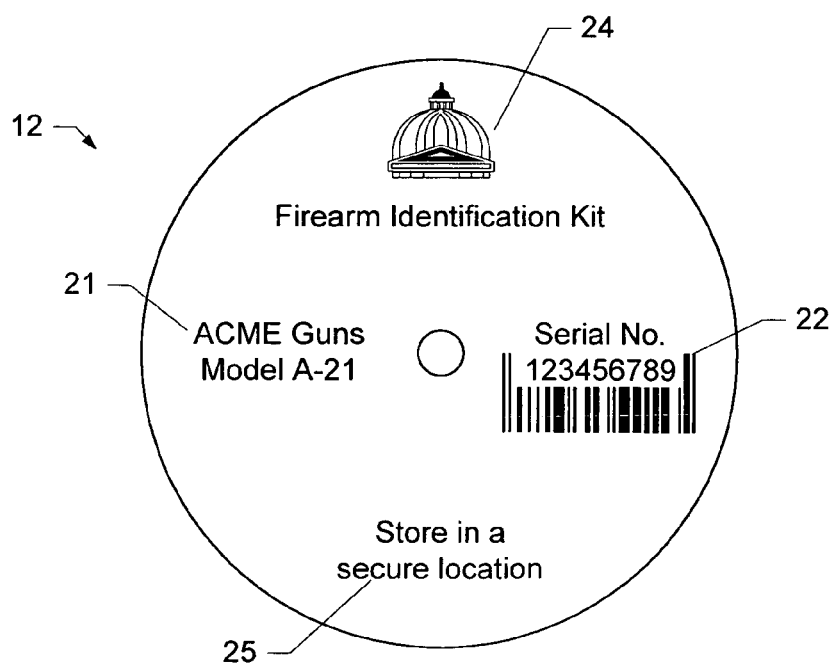
FIG. 2 is an illustrative embodiment of the data storage media of FIG. 1.

Preferably, a unique cartridge case identifying number and the serial number of the firearm are entered on a card or other print media that is maintained with the media. For example, protective case may include transparent cover 18 similar to a of CD/DVD jewel case. Label 30 of FIG. 3, which is a label or insert for cover 18, includes make and model 31 and serial number 22. Preferably, the same information is provided on the media itself as shown in FIG. 2. The information may either be printing on media 12 or printed on an adhesive label. Most preferably, the labels include a 1- or 2-dimensional bar code encoding the firearm-identifying information, such as the firearm descriptions and/or serial number, which can be affixed to, imprinted on or otherwise attached to the kit packaging, case, card and/or the storage medium (e.g., the CD or diskette) itself.

Figure 3:
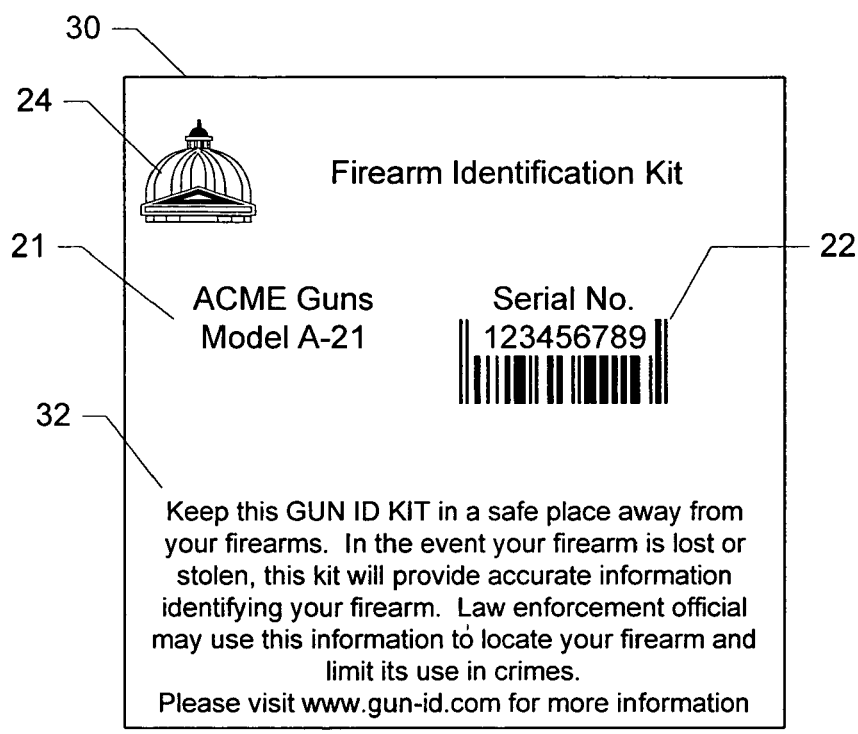
FIG. 3 is an illustrative embodiment of a cover or label associated with the firearm identification kit.

Any open space on the face of the CD or label may be used for a message from a firearm identification kit sponsor, for gun safety tips, and/or to list the procedure to follow if the gun is stolen or lost. For example, message 32 of FIG. 3 provides instructions for where to store the firearm identification kit and what to do in the event the associated firearm is lost or stolen. Logo 24 may identify an organization such as a local law enforcement agency or gun safety organization, or other group that is sponsoring firearm identification kits.

Data media 12 and label 30 may also include a reference to an online resource such as a web-site or email address that a gun owner may refer to in connection with the firearm identification kit. Such an online resource may provide additional instructions or procedures to be followed when a gun is lost or stolen. A means may also be provided to upload or transfer the firearm identification information from the storage media to the web-site or other on-line data repository. The identification information may then be made available to Federal, State and local law enforcement agencies or other authorized personnel. Preferably, the uploaded information is not linked to any personally identifying information, such as the name, address, phone number, etc. of either the gun owner or the person uploading the data. However, a police case file number and contact information should be included so that the proper authorities may be contacted if a matching cartridge case or firearm is found. This may help return a missing firearm to its rightful owner.

The widespread use of firearm identification kits would help disrupt the movement of stolen guns, return more stolen guns to their rightful owners, make it harder for criminals to re-introduce stolen guns into legitimate commerce, and provide police with more leads to solve more crimes, even if efforts were taken to obliterate the serial numbers which, until the advent of ballistics comparison and "tool mark imaging" were the only means of uniquely identifying a firearm.

In addition to the firearm identification information recorded on optical media 12, prospective users of the program could be educated, through a public awareness campaign, to periodically preserve a cartridge case fired from their firearms and store the cartridge case with media 12. For example, protective case 15 of FIG. 1 includes recess 17 for storing cartridge case 13. In the event that a firearm is stolen, the owner may submit the sample cartridge case 13 for tool mark imaging and storage. If a firearm identification kit is available for the gun, the images from the sample cartridge cases may be added to the data storage media already in the kit. Because the gun is stolen, the tool mark imaging data may also be submitted directly to the National Integrated Ballistic Identification Network as crime gun data.

Figure 4:
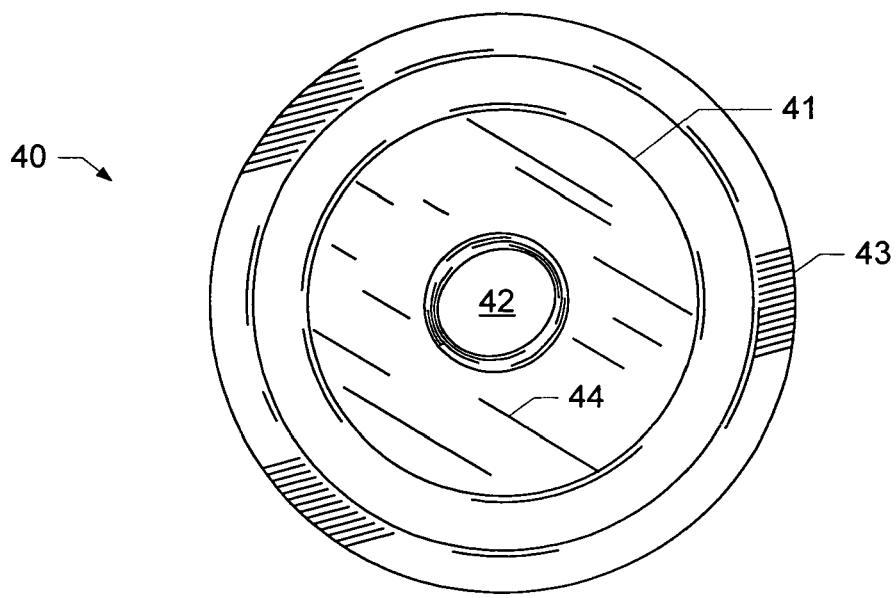
FIG. 4. is an illustrative embodiment of a spent cartridge case.

The image data recorded on media 12 is captured using Tool Mark Imaging (TMI). TMI refers to the capturing and storing of electronic images and data from the bullets and cartridge cases of test fired firearms. TMI captures an image of a bullet or cartridge case and reveals the unique markings left on the bullet or cartridge by the firearm. These markings may function as a gun's fingerprint or "electronic serial number". FIG. 4 is an illustration of a breech face of a fired cartridge casing showing numerous tool marks such as scratches 43 and 44, which are typically caused when a cartridge is chambered and/or ejected. FIG. 4 also shows firing pin impression 42, which may also have characteristics uniquely identifying the firearm from which the cartridge was fired. TMI information such as the markings shown in FIG. 4, may be provide police with leads to trace crime guns, stolen guns, and guns with obliterated serial numbers.

One skilled in the art will thus appreciate that the present invention can be practiced by other than the disclosed embodiments, which are presented for purposes of illustration and not of limitation, and that the present invention is limited only by the claims which follow.

What is claimed is:

1. A firearm identification kit configured to be distributed to the owner of a firearm comprising:
    a recess for at least one spent cartridge case that has been fired by the firearm; and
    a computer readable data storage medium in which is stored:
        identifying indicia corresponding to a firearm; and
        at least one image of a spent cartridge case fired by the firearm.

2. The kit according to claim 1 further comprising at least one spent cartridge case that has been fired by the firearm.

3. The kit according to claim 2 further comprising a protective case for storing the computer readable data storage medium and the at least one spent cartridge case.

4. The kit according to claim 1, wherein the at least one image is compatible with an automated ballistic matching system.

5. The kit according to claim 1, wherein the image is compatible with the National Integrated Ballistic Information Network.

6. The kit according to claim 1 in which the data storage medium is a non-volatile data storage medium.

7. The kit according to claim 6, wherein the data storage medium comprises an optical disk.

8. The kit according to claim 7, wherein the optical disk cannot be erased.

9. The kit according to claim 1, further comprising data for ensuring the integrity of the firearm identification information.

10. The kit according to claim 1, wherein the data storage medium comprises human readable indicia corresponding to the firearm associated with the kit.

11. The kit according to claim 1, wherein the at least one image includes a close-up image of a breech face of a spent cartridge case.

12. The kit according to claim 11, wherein the computer readable storage medium further includes textual descriptions of the at least one image.

13. A method of identifying a firearm, comprising:
    obtaining from the owner of a firearm a computer readable storage medium including at least one image of a first spent cartridge case fired by the firearms;
    obtaining an image of a second spent cartridge case;
    comparing the images of the first and second shells; and
    determining whether the images of the first and second shells match.

14. The method according to claim 13, wherein obtaining the image of the spent cartridge case comprises selecting an image from a plurality of images of spent cartridge cases.

15. A gun kit configured to be distributed to the owner of a gun, comprising:
    a firearm;
    a digital medium on which is stored at least one image of a cartridge case fired by the firearm; and
    a recess for at least one spent cartridge case that has been fired by the firearm.

16. A gun kit configured to be distributed to the owner of a gun, comprising:
    a firearm;
    a digital medium on which is stored at least one image of a cartridge case fired by the firearm; and
    at least one spent cartridge case that has been fired by the firearm.

* * * * *